Nov. 21, 1967    R. L. BELL    3,353,830
END SECURING MEANS FOR A SPACER EXPANDER
OF A PISTON RING ASSEMBLY
Filed March 23, 1964

INVENTOR.
ROSCOE L. BELL
BY
ATTORNEYS

3,353,830
END SECURING MEANS FOR A SPACER EXPANDER OF A PISTON RING ASSEMBLY
Roscoe L. Bell, R.R. 1, Springport, Ind. 47386
Filed Mar. 23, 1964, Ser. No. 353,691
3 Claims. (Cl. 277—9.5)

This invention relates to piston rings in general, and more particularly, to an oil ring assembly for use in conjunction with the piston and cylinder of an internal combustion engine.

Many various types and constructions of oil rings exist in the art. One such type is referred to as an oil ring assembly and includes a pair of rails and a circumferentially expansible combination spacer-expander. In this assembly, the rails are positioned on opposed axial sides of the spacer-expander and a portion of the latter engages the radially inner side of the rails so that when the oil ring assembly is disposed in the groove of a piston, the spacer-expander is circumferentially compressed while it axially spaces the rails and, since it is resilient and tends to circumferentially expand, it urges the rails radially outwardly against the cylinder wall.

The prior art oil rings of the above type have provided much difficulty in the handling, shipping and assembling operations, in that for assembly purposes the components that is, both the rails and the spacer-expander, are radially split so as to present a split annular configuration with the two adjacent circumferential ends. This split angular configuration of the spacer-expander introduces a handling and shipping problem since these ports tend to become entwined and difficult to separate. They also provide an assembly problem in that, since they are installed in the oil ring groove first and subsequently the rails are installed, the adjacent circumferential ends of the spacer-expander have a tendency to overlap each other prior to and during the assembly of the rails in the groove and thereby result in the rails, where they overlie the overlapped ends, projecting excessively from the oil ring groove. Once the rails and spacer-expander are properly assembled in the oil ring groove, the rails' engagement with the spacer-expander will prevent the overlapping thereof.

Many prior art means have been devised for inhibiting such overlapping of the adjacent circumferential ends of the spacer-expanders and include providing radially elongated shoulders on the ends adapted to abut each other and prevent such overlap. However, the radial size of the shoulders is limited, since they cannot project radially beyond the rails, and, therefore, they do not absolutely inhibit overlap and when overlap does occur it is of an even greater radial amount than in the absence of the shoulders. Further, the shoulders not only do not inhibit but actually enhance the spacer-expanders becoming entwined in the shipping and handling operations.

Another prior art method of preventing overlap comprises a mechanical interlock for the ends of the spacer-expander, which interlocks engage each other and securely lock the ends together. These interlocks in operation require substantially exact alignment for engagement and once engaged are somewhat difficult to disengage. Accordingly, if the interlocks are engaged to inhibit entwining in the handling and shipping of the spacer-expanders, they must be disengaged to be assembled into the oil ring of the piston. This latter operation is not only time consuming, but often the interlock is damaged or destroyed so that the spacer-expander is no longer operative or at least requires repairs.

It is, therefore, an object of this invention to provide in a piston ring assembly including rails and a split spacer-expander, a means for inhibiting the circumferential ends of the spacer-expander from becoming overlapped or separated so as to interfere with shipping, handling or assembling.

It is another object of this invention to provide such a means for inhibiting overlapping which may be activated to inhibit entwining in handling and shipping and yet is easily inactivated and reactivated in the assembly operation.

Another object of this invention is to provide a piston ring assembly including a split spacer-expander and including means disposed on the circumferential ends of the latter for selectively maintaining the ends in abutting relationship so that the ends will not overlap nor will the spacer-expander tend to become entwined during handling and shipping.

Further and other objects of this invention will become apparent upon a consideration of the specification when taken in view of the following drawings wherein.

Figure 1:
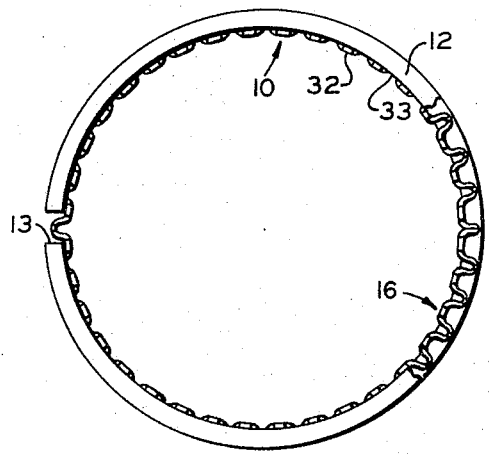
FIG. 1 is a plan view of the piston ring assembly embodying this invention.
Figure 4:
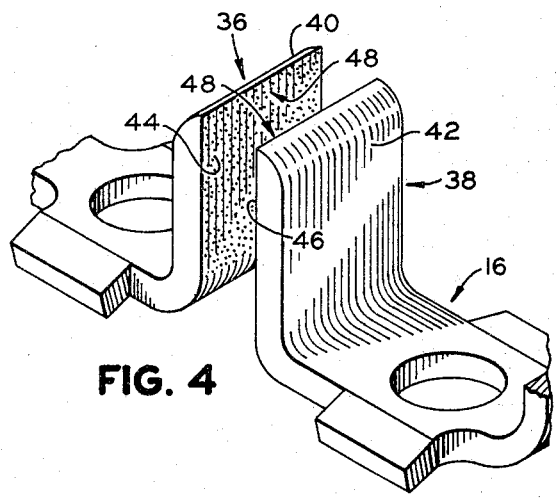
FIG. 4 is an enlarged fragmentary perspective view of a part of the assembly.
Figure 2:
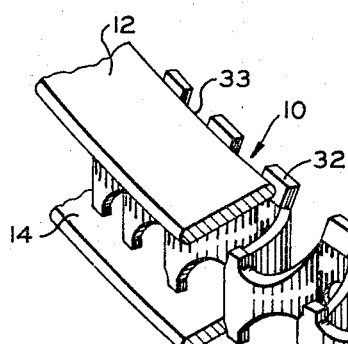
FIG. 2 is an enlarged radial sectional view showing the assembly in a groove of a piston and confined within a cylinder.
Figure 2:
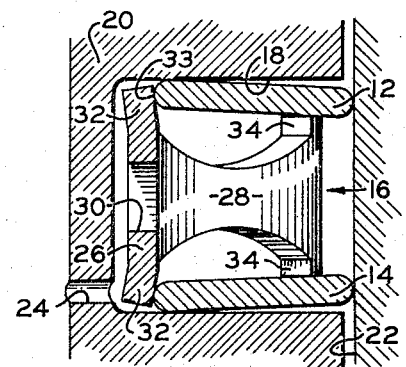
Figure 3:
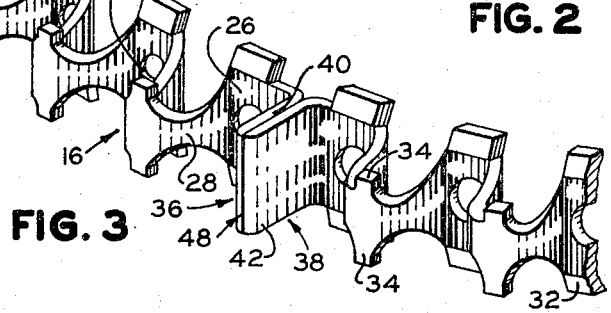
FIG. 3 is an enlarged fragmentary perspective view of the assembly with portions broken away for added clarity.

In a preferred embodiment of this invention, a piston ring assembly for installation in a piston ring groove includes a pair of spaced annular cylinder engaging rails and a combination spacer-expander for axially spacing the rails and forcing them radially outwardly. The spacer-expander comprises a plurality of circumferentially spaced axially extending support members, and a plurality of U-shaped spring members connecting the support members for circumferentially expanding the spacer-expander. The ends of the arms of the spring members are connected to and extend radially outwardly from the support member, and the radially outer portions of the spring members axially engage and space the rails, while tabs formed on the upper and lower sides of the support members engage the radially inner portion of the rails so that the spacer-expander is operable to urge the rails radially outward.

The spacer-expander while extending circumferentially, is radially split so as to present a pair of adjoining ends, which ends in the assembled condition preferably pressingly abut each other. A radially extending abutting shoulder is formed on each of these ends; the shoulders being operative to abuttingly engage each other to form a solid ring and inhibit overlapping of the ends. A layer of pressure-sensitive adhesive is applied to both abutting ends so that when these ends are pressed into abutting engagement, the adhesive will adhere and inhibit relative movement therebetween, thereby preventing overlapping of the ends and maintaining the "solid" ring construction to prevent entwining of the spacer-expanders.

Referring now to the drawings, a piston ring assembly 10 comprises a pair of annular rails 12 and 14 and a spacer-expander 16, and is adapted to be installed within a peripheral annular groove 18 formed in a piston 20 and confined within a cylinder 22 of an internal combustion engine. A passage 24 is formed in the piston 20 leading from the bottom of the groove 18 to the interior of the piston for draining oil from the groove 18.

Each of the rails 12 and 14 is preferably made from a flat strip of metal, such as spring steel, and is provided with a radially extending gap 13 to permit it to expand radially. Accordingly, each rail is resilient and, by itself, exerts some outward pressure against the wall of the cylinder 22.

The spacer-expander 16 comprises a plurality of circumferentially spaced support members 26 connected by U-shaped spring members 28. The ends of the arms of each spring member 28 are integrally connected to adjacent support members 26 and extend radially outwardly therefrom. An opening 30 is formed at substantially the center of each support member 26 for oil drainage purposes. A tab 32 is formed on each of the lower and upper sides of the support member and extends axially outward and radially inwardly therefrom to a position where the same engage the radially inner edge 33 of the rails 12 and 14.

Each U-shaped spring member 28 is formed with an enlarged axially extending portion 34 at its radially outer extremities which portions axially engage the rails 12 and 14 adjacent the outer periphery thereof and hold the same in an axially spaced relationship.

While the spacer-expander 16 is of substantially annular configuration, the same is formed with a pair of juxtaposed circumferential ends 36 and 38, which ends are adapted to be in abutting engagement when the spacer-expander is confined within a cylinder. The spacer-expander 16 is made from resilient sheet metal and, when its ends are in abutment, is circumferentially compressible as well as expansible and, when compressed, tends to increase its circumferential dimension when it is confined within a cylinder. This tendency toward expansion causes it to exert a radially outward pressure against the inner peripheries 33 of the rails 12 and 14 to force the latter against the cylinder wall 22.

The ends 36 and 38 of the spacer-expander 16 are provided respectively with radially extending plates 40 and 42, which plates are adapted to abut each other and have approximately the same width as the supporting member 26. Means is provided for connecting the plates 40 and 42, and thereby the ends 36 and 38, together so that the same may not become overlapped in assembling the spacer-expander nor are free so that the spacer-expander 16 may become entwined with other spacer-expanders during handling and shipping. More particularly, the juxtaposed faces 44 and 46 of the plates 40 and 42 respectively have deposited thereon a coating of adhesive 48 of the pressure-sensitive type, so that when the faces 44 and 46 are pressed into abutting engagement, the adhesive 48 disposed thereon will adhesively and semi-securedly maintain the abutting relationship.

The pressure sensitive adhesive 48 is preferably of the type which will retain its adhesive properties for a considerable length of time after being applied to the faces 44 and 46 and prior to pressure being applied thereto when the faces 44 and 46 are brought into abutting engagement. Additionally, the adhesive may have a low strength since once the spacer ring assembly 10 is positioned in the groove 18, the rails 12 and 14, as a result of their engagement with the tabs 32, will maintain the spacer-expander in its proper position so that the ends 36 and 38 thereof will not move to an overlapped relationship. The low strength of the adhesive is also preferred in that it is desirable to press the faces 44 and 46 into adhesive engagement subsequent to the manufacture of the ring so that during handling and shipping thereof the spacer-expanders will not be capable of becoming entwined, and prior to assembly into the groove 18, the operator may easily separate the faces 44 and 46 so that the spacer-expander may be positioned in the groove and the faces 44 and 46 once again pressed into an adhesive abutting engagement inhibiting overlapping of the ends 36 and 38 of the spacer-expander.

One such adhesive, which has been found to have satisfactory physical characteristics and to operate as desired, is marketed under the name "Crown Industrial Adhesive" manufactured by the Crown Industrial Products Company.

Another advantage of utilizing the low strength adhesive 48 on the faces 44 and 46 is that in the assembly operation, it is not essential that the plates 40 and 42 be exactly radially aligned, since the rails 12 and 14 will align the plates once they are installed and engage the tabs 32; and, even though not radially aligned, the required non-overlapped condition is effected by the adhesive. Accordingly, the spacer-expander 16 need only be positioned in the groove 18 and the faces 44 and 46 brought into a pressing abutting relationship; the pressure sensitive adhesive 48 will then maintain this relationship until the rails 12 and 14 are assembled. The rails 12 and 14, since they are made of a resilient metal will overcome the positioning of the low strength adhesive and by their engagement with the tabs 32 position the plates 40 and 42 in radial alignment. With the prior art devices, such as the mechanical interlock, the abutting portions carrying the interlock must be substantially aligned before the interlock may be activated to secure the ends of the spacer-expander.

From the foregoing, it is apparent that means have been provided for inhibiting the ends of a spacer-expander from overlapping, which means may be utilized to inhibit entwining and handling and shipping, and which may be easily activated, inactivated and reactivated without damaging the spacer-expander.

While a preferred embodiment of this invention has been shown and described, it is understood that such showing and description is illustrative only and that many changes may be made therein without departing from the scope of this invention as defined by the appended claims.

What is claimed is:

1. A piston ring assembly adapted to be installed in a groove in a piston which cooperates with the cylinder of an internal combustion engine, comprising an annular resilient rail having a radially outer periphery operative to pressingly and slidingly engage the cylinder, a spacer-expander having engaging means thereon engaging at least part of the radially inner surface of said rail and operative to force said rail radially outwardly, said spacer-expander being circumferentially compressible and expansible and having a split annular configuration thereby defining a pair of adjoining ends, abutment means carried by each end of said spacer-expander and having abutting surfaces adapted to abuttingly engage each other so that said spacer-expander is operable in circumferential compression and expansion as a solid ring, and pressure-sensitive adhesive disposed on the abutting surfaces of said abutment means for adhesively securing said abutment means to each other, whereby upon said abutment means being pressed together the adhesive will adhesively retain the abutting relationship thereof.

2. The combination with a pair of rails adapted to be installed in a groove in a piston which cooperates with the cylinder of an internal combustion engine, of a spacer-expander disposed axially between said rails and axially spacing the same, said spacer-expander having engaging means thereon adapted to engage at least part of the radially inner surface of the rails and operative to force the latter radially outwardly, said spacer-expander being circumferentially compressible and expansible and having a split annular configuration thereby defining a pair of adjoining ends, abutment means carried by each end of said spacer-expander and having abutting surfaces adapted to abuttingly engage each other, the abutting surfaces of said abutment means which are adapted to engage each other extending substantially radially so that said spacer-expander functions in circumferential compression and expansion as a solid ring, and pressure-sensitive adhesive disposed on the adjoining faces of said abutment means for adhesively securing said abutment means to each other whereby upon said abutment means being pressed together said adhesive will adhesively retain the abutting relationship therefor.

3. A spacer-expander according to claim 2 wherein said pressure-sensitive adhesive is of relatively low strength so that the abutment means may be adhesively secured and disengaged, and retaining its pressure sensitive qualities for a substantially long period of time subsequent to its being placed on said abutment means and prior to its adhesively securing the same.

References Cited

UNITED STATES PATENTS

| | | | |
|---|---|---|---|
| 2,781,899 | 2/1957 | Schmank | 206—46 |
| 3,004,811 | 10/1961 | Mayfield | 277—141 X |
| 3,099,560 | 7/1963 | Kouri | 96—78 |
| 3,140,096 | 7/1964 | Rodenkirchen | 277—141 |
| 3,184,245 | 5/1965 | Woolcott | 277—141 X |

FOREIGN PATENTS 1,123,357  6/1956  France.

LAVERNE D. GEIGER, *Primary Examiner.*

J. S. MEDNICK, *Assistant Examiner.*